US007012114B2

(12) United States Patent
Bett et al.

(10) Patent No.: US 7,012,114 B2
(45) Date of Patent: *Mar. 14, 2006

(54) SURFACE CHEMISTRY MODIFIED LATEX AND REDISPERSIBLE POWDERS, PRODUCTION AND USE THEREOF

(76) Inventors: William Bett, 33, avenue du Général Michel Bizot, Paris F-75012 (FR); Jean-Christophe Castaing, 30, rue Pradier, Paris F-75019 (FR); Jean-Francois D'Allest, 19, avenue Roger Salengro, Mulhouse F-68100 (FR)

(*) Notice: Subject to any disclaimer, the term of this patent is extended or adjusted under 35 U.S.C. 154(b) by 165 days.

This patent is subject to a terminal disclaimer.

(21) Appl. No.: 10/149,018

(22) PCT Filed: Dec. 8, 2000

(86) PCT No.: PCT/FR00/03454

§ 371 (c)(1),
(2), (4) Date: Jun. 4, 2002

(87) PCT Pub. No.: WO01/42325

PCT Pub. Date: Jun. 14, 2001

(65) Prior Publication Data

US 2003/0114548 A1 Jun. 19, 2003

(30) Foreign Application Priority Data

Dec. 10, 1999 (FR) .................................. 99 15714

(51) Int. Cl.
*C08J 3/03* (2006.01)
*C08F 2/10* (2006.01)

(52) U.S. Cl. ...................... 524/458; 524/457; 524/461; 524/501; 524/505; 525/243; 525/267

(58) Field of Classification Search ................ 524/457, 524/458, 461, 500, 501, 502, 505; 525/267, 525/242, 243, 244, 246
See application file for complete search history.

(56) References Cited

U.S. PATENT DOCUMENTS

| 5,314,962 | A | 5/1994 | Otsu et al. ............... 525/280 |
| 6,355,718 | B1 * | 3/2002 | Berge et al. .............. 524/461 |
| 2004/0030030 | A1 * | 2/2004 | Castaing et al. .......... 524/500 |

FOREIGN PATENT DOCUMENTS

| EP | 0 296 850 | | 12/1988 |
| EP | 0 421 149 | | 4/1991 |
| FR | 2794464 | A1 * | 12/2000 |
| WO | WO 96/15157 | | 5/1996 |
| WO | WO 98/01478 | | 1/1998 |
| WO | WO 98/58974 | | 12/1998 |
| WO | WO 99/05099 | | 2/1999 |
| WO | WO 99/31144 | | 6/1999 |
| WO | WO 99/35177 | | 7/1999 |
| WO | WO 99/35178 | | 7/1999 |

* cited by examiner

*Primary Examiner*—Vasu Jagannathan
*Assistant Examiner*—Vickey Ronesi

(57) ABSTRACT

The present invention relates to a latex with modified surface chemistry, which may be obtained by carrying out a free-radical emulsion polymerization in the presence of at least one ethylenically unsaturated monomer or at least one polymer containing residual ethylenically unsaturated bonds, of at least one free-radical polymerization initiator, of at least one water-soluble and/or water-dispersible monoblock, diblock or triblock polymer comprising at its end an active group capable of forming a radical, chosen from dithioesters, xanthates, thioether-thiones and diothiocarbamates. The invention similarly relates to redispersible powders that may be obtained by drying the said latices.

30 Claims, No Drawings

SURFACE CHEMISTRY MODIFIED LATEX AND REDISPERSIBLE POWDERS, PRODUCTION AND USE THEREOF

This application is an application under 35 U.S.C. Section 371 of International Application Number PCT/FR00/03454 filed on Dec. 8, 2000.

The present invention relates to a latex with modified surface chemistry, and also to redispersible powders that may be obtained from the said latices.

The invention similarly relates to the production of latices and powders.

Finally, the invention relates to formulations intended for uses in building materials, adhesives, paints and papers comprising the latices or powders, and also to the use of the latices or powders in such formulations.

Latices are products that are well known to those skilled in the art, as are the redispersible powders obtained from these latices. They find many applications, especially as additives in formulations for paints, for paper (coating mixtures, bulk paper) or in formulations intended to be applied in the building industry (adhesive, bonding agents, smoothing coatings, etc.). They give important properties to the formulations in the composition into which they are incorporated, by virtue, for example, of their binding power, their film-forming power and their ability to impart particular Theological properties.

However, in the case of certain formulations such as, for example, water-based paint formulations, it is found to be necessary to satisfy two contradictory requirements. Thus, in these pigment-rich paint formulations, the latex used as binder must not only have good colloidal stability in wet paint (before drying), so as to avoid an increase in viscosity during storage, but also, in dry form, must show good adhesion to pigments, in order for the coat of paint to have the desired mechanical characteristics. Now, it has been shown that one of the phenomena involved in increasing the viscosity on storage is the wet adsorption of the latices onto the pigments. These two properties are thus, in principle, antinomic, since, in order to satisfy the first, it is sought to reduce the latex/filler interactions, whereas these need to be promoted in order to satisfy the second.

In general, for all the applications of latices, it is sought to reconcile good colloidal stability of the aqueous formulations before drying, and good water resistance after drying.

Hitherto, the solutions provided to solve the problem of colloidal stability consisted in introducing a sufficiently large amount of monomers during the synthesis of latices, or alternatively to graft hydrophilic macromonomers onto them. However, the presence of these hydrophilic species has the consequence of impairing the water-resistance properties of the final latex, and thus of harming the second requirement. This solution is therefore not entirely satisfactory.

As regards redispersible powders, it should be noted that these must be able to be readily redispersed in aqueous media, while at the same time conserving a certain level of insensitivity to water. Redispersible powders are generally obtained by drying latices, in the presence of a drying adjuvant. However, although the powders thus obtained have good redispersion properties, the presence of this drying adjuvant, which is used in large amounts (of the order of 10 to 20% relative to the latex), is the cause of difficulty in the subsequent use of the formulations containing them. For example, in the case of formulations intended for construction applications, the presence of this adjuvant may result in delays in setting, a discoloration of the formulation, water sensitivity, heat sensitivity, etc.

In this case also, a satisfactory compromise remains to be found.

One of the aims of the present invention is to propose a latex with modified surface chemistry, and redispersible powders, to solve the problems mentioned above.

Thus, the latices according to the present invention have increased stability in paint formulations.

Similarly, it has been found that the redispersible powders obtained from these latices show increased redispersibility when compared with those obtained from latices obtained by conventional methods using the same monomers in the same proportions.

In addition, it has been noted, entirely unexpectedly, that the redispersible powders obtained according to the invention no longer make it necessary to use such large amounts of drying adjuvant as those conventionally used to obtain a good redispersion.

It should furthermore be noted that the latices introduced into formulations for paints, building materials and papers have good wet and dry binding power.

These aims and others are achieved by the present invention, one subject of which is thus a latex with modified surface chemistry, which may be obtained by carrying out a free-radical emulsion polymerization in the presence:

of at least one ethylenically unsaturated monomer or at least one polymer containing residual ethylenically unsaturated bonds, of at least one free-radical polymerization initiator, of at least one water-soluble and/or water-dispersible monoblock, diblock or triblock polymer comprising at its end an active group capable of forming a radical, chosen from dithioesters, thioether-thiones, diothiocarbamates and xanthates.

A subject of the invention is similarly redispersible powders that may be obtained by drying the latices.

Similarly, the invention relates to formulations intended to be applied in building materials, in paint materials, in paper material and in adhesive and pressure-sensitive adhesive materials comprising the latex or the redispersible powders.

Similarly, the invention relates to the use of latices and redispersible powders in formulations intended to be used in the construction industry and the paint industry.

However, other advantages and characteristics of the present invention will emerge more clearly on reading the description and the examples that follow.

As has been mentioned previously, the process according to the invention consists in carrying out a free-radical polymerization in the presence of a water-soluble and/or water-dispersible monoblock, diblock or triblock polymer comprising at its end an active group capable of forming a radical, and chosen from dithioesters, thioether-thiones, dithiocarbamates and xanthates.

A polymer is considered to be water-dispersible and/or water-soluble, according to the invention, if it shows the following behaviour:

1) On a macroscopic scale:
   for at least 90% of the solution/dispersion, no decantation or separation of macroscopic phases is observed for a solution/dispersion comprising 10 to 50% by weight of polymer, over a time scale of 7 days.

2) On a microscopic scale:
   2.1) either the polymer does not self-associate at the microscopic scale, and is in the form of individual chains;

2.2) or the polymer self-associates, at the microscopic scale, locally, to form aggregates or micelles, in the manner of associative polymers or surfactants.

In the latter case, these are not gelled structures. It is recalled that this term means that the average residence time of an individual chain inside this gelled structure is at least 15 minutes.

According to a first embodiment of the present invention, the monoblock, diblock or triblock polymer corresponds to the following formula:

$$(R^{11})x\text{-}Z^{11}\text{-}C(=S)\text{-}Z^{12}\text{-}[A]\text{-}R^{12} \quad (I)$$

in which formula:

$Z^{11}$ represents C, N, O, S or P,
$Z^{12}$ represents S or P, $R^{11}$ and $R^{12}$, which may be identical or different, represent:
- an optionally substituted alkyl, acyl, aryl, alkene or alkyne group (i), or
- a saturated or unsaturated, optionally substituted or aromatic carbon-based ring (ii), or
- a saturated or unsaturated, optionally substituted heterocycle (iii), these groups and rings (i), (ii) and (iii) possibly being substituted with substituted phenyl groups, substituted aromatic groups or groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, groups of hydrophilic or ionic nature such as the alkali metal salts of carboxylic acids, the alkali metal salts of sulphonic acid, polyalkylene oxide (PEO or PPO) chains and cationic substituents (quaternary ammonium salts), R representing an alkyl or aryl group, x corresponds to the valency of $Z^{11}$, or alternatively x is 0, in which case $Z^{11}$ represents a phenyl, alkene or alkyne radical, optionally substituted with an optionally substituted alkyl; acyl; aryl; alkene or alkyne group; an optionally substituted, saturated, unsaturated, or aromatic, carbon-based ring; an optionally substituted, saturated or unsaturated heterocycle; alkoxycarbonyl or aryloxycarbonyl (—COOR); carboxyl (COOH); acyloxy (—O$_2$CR); carbamoyl (—CONR$_2$); cyano (—CN); alkylcarbonyl; alkylarylcarbonyl; arylcarbonyl; arylalkylcarbonyl; phthalimido; maleimido; succinimido; amidino; guanidimo; hydroxyl (—OH); amino (—NR$_2$); halogen; allyl; epoxy; alkoxy (—OR), S-alkyl; S-aryl groups; groups of hydrophilic or ionic nature such as the alkali metal salts of carboxylic acids, the alkali metal salts of sulphonic acid, polyalkylene oxide (PEO or PPO) chains and cationic substituents (quaternary ammonium salts);

A represents a monoblock, diblock or triblock polymer.

According to one advantageous variant of the invention, the compound of formula (I) is such that $Z^{11}$ is an oxygen atom and $Z^{12}$ is a sulphur atom. These compounds are thus functionalized at the end of the chain with xanthates.

As regards the polymer A, it corresponds more particularly to at least one of the three formulae below:

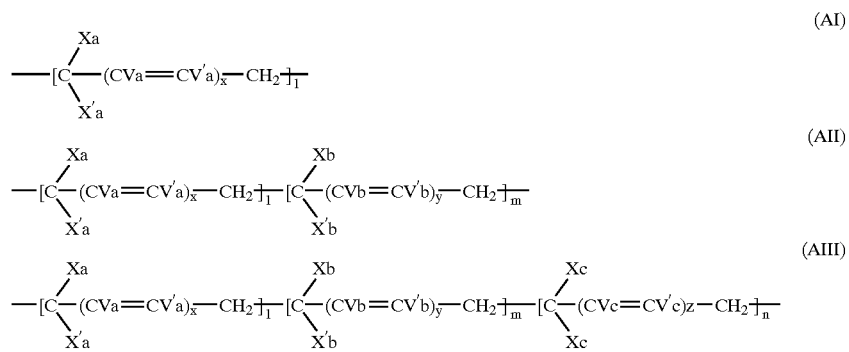

in which formulae:

Va, V'a, Vb, V'b, Vc and V'c, which may be identical or different, represent: H, an alkyl group or a halogen, Xa, X'a, Xb, X'b, Xc and X'c, which may be identical or different, represent H, a halogen or a group R, OR, OCOR, NHCOH, OH, NH2, NHR, N(R)$_2$, (R)$_2$N$^+$O$^-$, NHCOR, CO$_2$H, CO$_2$R, CN, CONH$_2$, CONHR or CONR$_2$, in which R, which may be identical or different, are chosen from alkyl, aryl, aralkyl, alkaryl, alkene and organosilyl groups, optionally perfluorinated and optionally substituted with one or more carboxyl, epoxy, hydroxyl, alkoxy, amino, halogen or sulphonic groups, l, m and n, which may be identical or different, are greater than or equal to 1, x, y and z, which may be identical or different, are equal to 0 or 1.

More particularly, the polymer A is obtained by using at least one ethylenically unsaturated monomer chosen from hydrophilic monomers.

Examples of such monomers that may especially be mentioned include
- ethylenically unsaturated monocarboxylic and dicarboxylic acids, for instance acrylic acid, methacrylic acid, itaconic acid, maleic acid or fumaric acid,
- monoalkyl esters of dicarboxylic acids of the type mentioned with alkanols preferably containing 1 to 4 carbon atoms, and N-substituted derivatives thereof, such as, 2-hydroxyethyl acrylate or methacrylate,
- unsaturated carboxylic acid amides, for instance acrylamide or methacrylamide,
- ethylenic monomers comprising a sulphonic acid group and amonium or alkali metal salts thereof, for example vinylsulphonic acid, vinylbenzenesulphonic acid, α-acrylamidomethyl propanesulphonic acid or 2-sulphoethylene methacrylate.

Needless to say, it is possible to incorporate into the polymer composition a proportion of hydrophobic monomers, provided that the solubility/dispersity conditions and the conditions of non-formation of gelled or non-gelled micelles, mentioned previously, remain valid.

Illustrations of hydrophobic monomers that may especially be mentioned include styrene or its derivatives, butadiene, chloroprene, (meth)acrylic esters, vinyl esters and vinyl nitriles.

The term "(meth)acrylic esters" denotes esters of acrylic acid and of methacrylic acid with hydrogenated or fluorinated $C_1$–$C_{12}$ and preferably $C_1$–$C_8$ alcohols. Among the compounds of this type that may be mentioned are: methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate, isobutyl methacrylate.

The vinyl nitriles more particularly include those containing from 3 to 12 carbon atoms, such as, in particular, acrylonitrile and methacrylonitrile.

It should be noted that the styrene may be totally or partially replaced with derivatives such as α-methylstyrene or vinyltoluene.

The other ethylenically unsaturated monomers that may be used, alone or as mixtures, or that are copolymerizable with the above monomers are especially:

vinyl esters of a carboxylic acid, for instance vinyl acetate, vinyl versatate or vinyl propionate, vinyl halides, vinylamine amides, especially vinylformamide or vinylacetamide, ethylenically unsaturated monomers comprising a secondary, tertiary or quaternary amino group, or a heterocyclic group containing nitrogen, such as, for example, vinylpyridines, vinylimidazole, aminoalkyl (meth)acrylates and aminoalkyl(meth)acrylamides, for instance dimethylaminoethyl acrylate or methacrylate, di-tert-butylaminoethyl acrylate or methacrylate, dimethylaminomethylacrylamide or dimethylaminomethylmethacrylamide. It is likewise possible to use zwitterionic monomers such as, for example, sulphopropyl (dimethyl)aminopropyl acrylate.

According to one particularly advantageous embodiment, the polymer A is a monoblock or a diblock polymer.

It should moreover be noted that the polymer A more particularly has a number-average molar mass of less than 20 000 and preferably less than 10 000. These molar masses are measured by steric exclusion chromatography, using polyethylene glycol as standard.

This type of monoblock, diblock or triblock polymer containing a reactive end is known to those skilled in the art and has especially been the subject of patent applications WO 98/58974 and WO 99/35178.

Reference may thus be made to the description of these two patent applications for the preferred definitions of the various groups and radicals, and similarly for their preparation.

According to a second embodiment of the invention, the monoblock, diblock or triblock polymer used is a polymer corresponding to the following formulae:

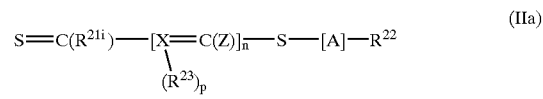

and/or:

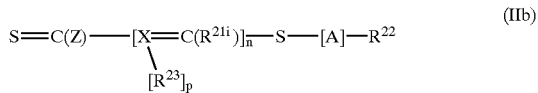

in which formulae:

X represents an atom chosen from N, C, P and Si, $R^{22}$ represents:
  an optionally substituted alkyl, acyl, aryl, alkene or alkyne group (i), or
  a saturated or unsaturated, optionally substituted or aromatic carbon-based ring (ii), or
  a saturated or unsaturated, optionally
  substituted or aromatic heterocycle (iii), these groups and rings (i), (ii) and (iii) possibly being substituted with substituted phenyl groups, substituted aromatic groups or groups:
  alkoxycarbonyl or aryloxycarbonyl (—COOR), carboxyl (—COOH), acyloxy (—$O_2$CR), carbamoyl (—$CONR_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—$NR_2$), halogen, allyl, epoxy, alkoxy (—OR), S-alkyl, S-aryl, organosilyl, groups of hydrophilic or ionic nature such as the alkali metal salts of carboxylic acids, the alkali metal salts of sulphonic acid, polyalkylene oxide (PEO or PPO) chains and cationic substituents (quaternary ammonium salts), R representing an alkyl or aryl group, Z, $R^{21i}$ and $R^{23}$, which may be identical or different, are chosen from:
  a hydrogen atom,
  an optionally substituted alkyl, acyl, aryl, alkene or alkyne group,
  a saturated or unsaturated, optionally substituted or aromatic carbon-based ring,
  a saturated or unsaturated, optionally substituted heterocycle,
  alkoxycarbonyl or aryloxycarbonyl (—COOR), carboxyl (—COOH), acyloxy (—$O_2$CR), carbamoyl (—$CONR_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR2), halogen, allyl, epoxy, alkoxy (—OR), S-alkyl, S-aryl and organosilyl groups, R representing an alkyl or aryl group,
  groups of hydrophilic or ionic nature such as the alkali metal salts of carboxylic acids, the alkali metal salts of sulphonic acid, polyalkylene oxide (PEO or PPO) chains and cationic substituents (quaternary ammonium salts).

$n > 0$, i ranges from 1 to n, p is equal to 0, 1 or 2 depending on the valency of X, and also if X═C, then Z is not an S-alkyl or S-aryl group, the group $R^{1i}$, where i=n, is not an S-alkyl or S-aryl group, A represents a monoblock, diblock or triblock polymer as defined previously.

The definition of the polymer A described in the case of the first variant remains valid and will not be repeated here. Reference may thus be made entirely thereto.

According to a third embodiment of the invention, the monoblock, diblock or triblock polymer used is a polymer corresponding to the following foimula:

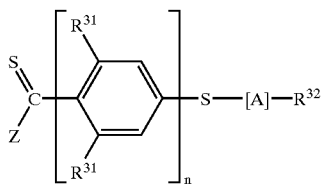

in which formula:

$R^{32}$ represents:

an optionally substituted alkyl, acyl, aryl, alkene or alkyne group (i), or
- a saturated or unsaturated, optionally substituted or aromatic carbon-based ring (ii), or
- a saturated or unsaturated, optionally substituted or aromatic heterocycle (iii),
- these groups and rings (i), (ii) and (iii) possibly being substituted with substituted phenyl groups, substituted aromatic groups or groups:
- alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, organosilyl, groups of hydrophilic or ionic nature such as the alkali metal salts of carboxylic acids, the alkali metal salts of sulphonic acid, polyalkylene oxide (PEO or PPO) chains and cationic substituents (quaternary ammonium salts),
  R representing an alkyl or aryl group, Z is chosen from:
- a hydrogen atom,
- an optionally substituted alkyl, acyl, aryl, alkene or alkyne group,
- a saturated or unsaturated, optionally substituted or aromatic carbon-based ring,
- a saturated or unsaturated, optionally substituted heterocycle,
- alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl and organosilyl groups, R representing an alkyl or aryl group,
- groups of hydrophilic or ionic nature such as the alkali metal salts of carboxylic acids, the alkali metal salts of sulphonic acid, polyalkylene oxide (PEO or PPO) chains and cationic substituents (quaternary ammonium salts), $R^{31}$ and $R^{33}$, which are identical or different, are chosen from
- a hydrogen atom,
- an optionally substituted alkyl, acyl, aryl, alkene or alkyne group,
- a saturated or unsaturated, optionally substituted or aromatic carbon-based ring,
- a saturated or unsaturated, optionally substituted heterocycle,
- alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl and organosilyl groups, R representing an alkyl or aryl group,
- groups of hydrophilic or ionic nature such as the alkali metal salts of carboxylic acids, the alkali metal salts of sulphonic acid, polyalkylene oxide (PEO or PPO) chains and cationic substituents (quaternary ammonium salts),
- groups $SR^{32}$, n>0.

The definition of the polymer A described in the case of the first variant remains valid and will not be repeated here. Reference may thus be made entirely thereto.

According to a fourth embodiment of the invention, the monoblock, diblock or triblock polymer used corresponds to the following formula:

in which formula:

$R^{41}$ represents:

an optionally substituted alkyl, acyl, aryl, alkene or alkyne group (i), or
- a saturated or unsaturated, optionally substituted or aromatic carbon-based ring (ii), or
- a saturated or unsaturated, optionally substituted or aromatic heterocycle (iii),
- these groups and rings (i), (ii) and (iii) possibly being substituted with substituted phenyl groups, substituted aromatic groups or groups:
- alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, organosilyl, groups of hydrophilic or ionic nature such as the alkali metal salts of carboxylic acids, the alkali metal salts of sulphonic acid, polyalkylene oxide (PEO or PPO) chains and cationic substituents (quaternary ammonium salts),
  R representing an alkyl or aryl group, Z, which may be identical or different, are chosen from:
- a hydrogen atom,
- an optionally substituted alkyl, acyl, aryl, alkene or alkyne group,
- a saturated or unsaturated, optionally substituted or aromatic carbon-based ring,
- a saturated or unsaturated, optionally substituted heterocycle,
- alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl and organosilyl groups, R representing an alkyl or aryl group, groups of hydrophilic or ionic nature such as the alkali metal salts of carboxylic acids, the alkali metal salts of sulphonic acid, polyalkylene oxide (PEO or PPO) chains and cationic substituents (quaternary ammonium salts), n>0.

The definition of the polymer A described in the case of the first variant remains valid and will not be repeated here. Reference may thus be made entirely thereto.

The polymers (IIa), (IIb) (III) and (IV) may be obtained by placing in contact at least one ethylenically unsaturated monomer, at least one source of free radicals and at least one compound of formula (A), (B) or (C)

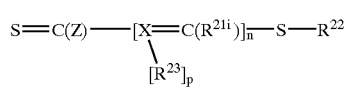  (A)

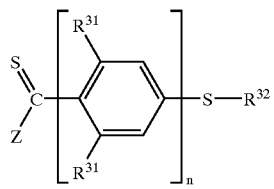  (B)

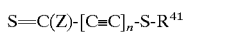  (C)

$S=C(Z)$-$[C\equiv C]_n$-$S$-$R^{41}$

Generally, these polymers have a polydispersity index of not more than 2 and preferably not more 1.5.

The production of the diblock or triblock polymers consists in repeating the implementation of the polymerization process described above one or two times, using:

monomers different from the previous implementation, and in place of the compound of formula (A), (B) or (C), the block polymer obtained from the previous implementation, known as the precursor polymer.

Optionally, it may be desired to place blocks of controlled polydispersity at the surface of the latices. In this case, several solutions of monoblock, diblock and/or triblock polymer, each having a well-defined molecular mass, may be mixed together in specific proportions.

According to this process for preparing multiblock polymers, when it is desired to obtain polymers with homogeneous blocks rather than with a composition gradient, and when all the successive polymerizations are performed in the same reactor, it is essential for all the monomers used during one step to have been consumed before the polymerization of the following step commences, and thus before the new monomers are introduced.

As for the process for polymerizing monoblock polymer, this process for polymerizing block polymers has the advantage of leading to block polymers with a low polydispersity index. It also makes it possible to control the molecular mass of the block polymers.

The block polymers corresponding to formulae (II) to (IV) have been the subject of a French patent application No. FR 99/07097.

It should be noted that the principles for preparing monoblock, diblock and triblock polymers applied to these three variants of the invention may be extrapolated to the other polymer variants according to the invention.

According to a fifth embodiment of the invention, the monoblock, diblock or triblock polymer used corresponds to the following formula:

  (V)

in which formula:

$R^{51}$ represents:

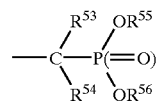

in which:

$R^{53}$ and $R^{54}$ which may be identical or different, are chosen from halogen, =O, =S, —NO$_2$, —SO$_3$R, NCO, CN, OR, —SR, —NR$_2$, —COOR, O$_2$CR, —CONR$_2$ and —NCOR$_2$ groups with R representing a hydrogen atom or an alkyl radical, alkenyl radical, alkynyl radical, cycloalkenyl radical, cycloalkynyl radical, aryl radical optionally fused to an aromatic or non-aromatic heterocycle, alkylaryl radical, aralkyl radical or heteroaryl radical; these radicals may optionally be substituted with one or more groups, that may be identical or different, chosen from halogens, =O, =S, OH, alkoxy, SH, thioalkoxy, NH$_2$, monoalkylamino, dialkylamino, CN, COOH, ester, amide and CF$_3$ and/or optionally interrupted with one or more atoms chosen from O, S, N and P; or from a heterocyclic group optionally substituted with one or more groups as defined above;

or $R^{53}$ and $R^{54}$ form, together with the carbon atom to which they are attached, a hydrocarbon-based ring or a heterocycle;

$R^{53}$ and $R^{56}$, which may be identical or different, represent a group as defined above for R; or together form a C$_2$–C$_4$ hydrocarbon-based chain, optionally interrupted with a hetero atom chosen from O, S and N;

$R^{52}$ has the same definition as that given for $R^{53}$;

A represents a monoblock, diblock or triblock polymer.

According to one preferred variant, the groups $R^{53}$ are chosen from —CF$_3$, —CF$_2$CF$_2$CF$_3$, CN and NO$_2$.

Advantageously, $R^{54}$ represents a hydrogen atom.

The radicals $R^{55}$ and $R^{56}$, which may be identical or different, represent an alkyl radical, preferably a C$_1$–C$_6$ alkyl radical.

The polymers of formula (V) may be obtained by placing in contact at least one ethylenically unsaturated monomer, at least one source of free radicals and at least one compound of the following formulae:

  (A')

  (B')

  (C')

in which formulae:

$R^{51}$ and $R'^{51}$, which may be identical or different, have the same definition as that given previously for $R^{51}$, $R^{52}$ and $R'^{52}$, which may be identical or different, have the same meaning as that given previously for $R^{52}$, p represents an integer between 2 and 10.

The compounds of formula (A') may especially be obtained by reacting a carbonyl compound of formula $R^{53}$—C(=O)—$R^{54}$ with a phosphite of formula $(R^{55}O)HP(=O)(OR^{56})$. The resulting compound may then be placed in contact with carbon disulphide in the presence of an alkoxide, and then with a halide $R^{52}$—X.

The compounds of formulae (B') and (C') may be obtained by using an equivalent principle, but starting with polyhydroxylated compounds.

The ethylenically unsaturated monomers used to produce the latex will now be described.

Among the suitable monomers that may be mentioned most particularly are those corresponding to the following formula:

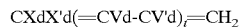

Xd and X'd, which may be identical or different, represent: H, an alkyl group or a halogen, Vd and V'd, which may be identical or different, represent H, a halogen or a group R, OR, OCOR, NHCOH, OH, $NH_2$, NHR, $N(R)_2$, $(R)_2N^+O^-$, NHCOR, $CO_2H$, $CO_2R$, CN, $CONH_2$, CONHR or $CONR_2$, in which R, which may be identical or different, are chosen from alkyl, aryl, aralkyl, alkaryl, alkene and organosilyl groups, optionally perfluorinated and optionally substituted with one or more carboxyl, epoxy, hydroxyl, alkoxy, amino, halogen or sulphonic groups, t is 0 or 1.

According to one particular embodiment of the invention, the monomers used are preferably hydrophobic monomers.

As illustrations of hydrophobic monomers, mention may be made especially of styrene or its derivatives, butadiene, choroprene, (meth)acrylic esters, vinyl esters and vinyl nitriles.

The term "(meth)acrylic esters" denotes esters of acrylic acid and of methacrylic acid with hydrogenated or fluorinated $C_1$–$C_{12}$ and preferably $C_1$–$C_8$ alcohols.

The vinyl nitriles more particularly include those containing from 3 to 12 carbon atom such as, in particular, acrylonitrile and methacrylonitrile.

It should be noted that the styrene can be replaced totally or partially with derivatives such as α-methylstyrene or toluene.

The other ethylenically unsaturated monomers that may be used, alone or as mixtures, or that are copolymerizable with the above monomers are especially:

vinyl esters of carboxylic acids,
vinyl halides,
vinylamine amides,
ethylenically unsaturated monomers comprising a secondary, tertiary or quaternary amino group, or a heterocyclic group containing nitrogen. It is similarly possible to use zwitterionic monomers such as, for example, sulphopropyl (dimethyl)aminopropyl acrylate.

It should be noted that it is possible to use hydrophilic monomers such as, for example
ethylenically unsaturated monocarboxylic and dicarboxylic acids,
monoalkyl esters of dicarboxylic acids of the type mentioned with alkanols preferably containing 1 to 4 carbon atoms, and N-substituted derivatives thereof,
amides of unsaturated carboxylic acids,
ethylenic monomers comprising a sulphonic acid group and its ammonium or alkali metal salts,
unsaturated carboxylic acid amides, for instance acrylamide, methacrylamide, N-methylolacrylamide or N-methylolmethacrylamide, and N-acrylamides.

It should be noted that all the monomers that have been mentioned in the context of the definition of the monoblock, diblock or triblock polymer may be used to obtain the latex. Reference may thus be made to this section of the description.

It should be noted that the ethylenically unsaturated monomer preferably used is at least one monomer chosen from styrene or its derivatives, butadiene, chloroprene, (meth)acrylic esters, vinyl esters and vinyl nitriles.

As regards the second possibility, which consists in using a polymer containing residual ethylenically unsaturated bonds, this polymer is obtained by free-radical polymerization of at least one ethylenically unsaturated monomer chosen from:

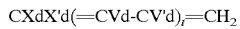

Xd and X'd, which may be identical or different, represent: H, an alkyl group or a halogen, Vd and V'd, which may be identical or different, represent H, a halogen or a group R, OR, OCOR, NHCOH, OH, $NH_2$, NHR, $N(R)_2$, $(R)_2N^+O^-$, NHCOR, $CO_2H$, $CO_2R$, CN, $CONH_2$, CONHR or $CONR_2$, in which R, which may be identical or different, are chosen from alkyl, aryl, aralkyl, alkaryl, alkene and organosilyl groups, optionally perfluorinated and optionally substituted with one or more carboxyl, epoxy, hydroxyl, alkoxy, amino, halogen or sulphonic groups, t is 0 or 1.

The polymerization reaction according to the invention takes place in the presence of a free-radical polymerization initiator. This may be chosen from the initiators conventionally used in free-radical polymerization. It may be, for example, one of the following initiators:

hydrogen peroxides such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutarate, lauroyl peroxide, t-amyl peroxypivalate, t-butyl peroxypivalate, dicumyl peroxide, benzoyl peroxide, potassium persulphate, ammonium persulphate, azo compounds such as: 2,2'-azobis(isobutyronitrile), 2,2'-azobis(2-butane-nitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis (2-methyl-N-[1,1-bis(hydroxymethyl)-2-hydroxyethyl]propionamide), 2,2'-azobis[2-methyl-N-1,1-bis(hydroxymethyl)-ethyl]propionamide, 2,2'-azobis[2-methyl-N-(2-hydroxyethyl)propionamide], 2,2'-azobis(isobutyramide) dihydrate, redox systems comprising combinations such as:
mixtures of hydrogen peroxide, of alkyl, peresters, percarbonates and the like and of any of the iron salts, titanous salts, zinc formaldehyde sulphoxylate or sodium formaldehyde sulphoxylate, and reducing sugars,
ammonium or alkali metal persulphates, perborate or perchlorate in combination with an alkali metal bisulphite, such as sodium metabisulphite, and reducing sugars, alkali metal persulphates in combination with an arylphosphinic acid, such as benzenephosphonic acid and the like, and reducing sugars.

The polymerization reaction takes place conventionally.

It is carried out in the presence of a nonionic or anionic surfactant chosen from alkoxylated mono-, di-or trialkylphenols, alkoxylated mono-, di-or tristyrylphenols, alkoxylated fatty alcohols and ammonium or alkali metal salts of $C_8$–$C_{12}$ alkyl sulphates, alkoxylated sulphated fatty alcohol semiesters, $C_{12}$–$C_{18}$ alkyl sulphonate esters, etc.

The polymerization temperature is also conventional. By way of illustration, the temperature is between 50 and 120° C. and more particularly between 70 and 100° C.

Thus, a first embodiment of the polymerization consists in carrying out this polymerization by introducing the ethylenically unsaturated monomer and the initiator into a solution of monoblock, diblock or triblock polymer.

According to a second embodiment of the polymerization, it is carried out by introducing in parallel the ethylenically unsaturated monomer, the initiator and a solution of monoblock, diblock or triblock polymer.

According to a third embodiment, the polymerization is performed by introducing the monoblock, diblock or triblock polymer and the initiator into a suspension comprising the polymer containing residual ethylenically unsaturated bonds.

Another subject of the present invention consists of redispersible powders that may be obtained by drying the latex of modified surface chemistry.

The drying may be performed in a manner that is known per se.

Thus, a drying at low temperature or, preferably, by spraying, may be carried out.

It may be carried out in any known device such as, for example, a spraying tower combining spraying performed via a nozzle or a turbomixer with a stream of hot gas.

The inlet temperature of the hot gas (generally air), at the top of the column, is preferably between 100 and 115° C. and the outlet temperature is preferably between 55 and 65° C.

According to one advantageous embodiment of the present invention, the drying is performed in the presence of a drying adjuvant.

Standard dispersants may be used. For example, mention may be made of polyphenols, glutamic acid salts, polyvinyl alcohol, polyvinylpyrrolidone or cellulose derivatives. It should be noted that a nonionic or anionic surfactant may also be used.

In a particularly advantageous manner, the content of drying adjuvant is less than or equal to 5% by weight relative to the polymer.

The latices and redispersible powders that form the subject of the present invention may be used in the conventional fields of use, such as in the field of building materials, of paints, of paper and of adhesives, that may or may not be pressure-sensitive, inter alia.

Thus, a subject of the present invention is similarly formulations intended for applications in the building materials industry, comprising the latex of modified surface chemistry, or the redispersible powders.

The invention also relates to formulations intended for applications in the field of paints, comprising the latex, or the redispersible powders.

Finally, it relates to formulations intended for applications in the field of adhesives and of pressure-sensitive adhesives, comprising the latex or the redispersible powders.

Concrete but non-limiting examples of the invention will now be given.

EXAMPLES 1

These examples illustrate the preparation of monoblock and diblock polymers according to the invention.

Example 1.1

Preparation of a Polyacrylic Acid Monoblock Polymer Comprising a Reactive End of Xanthate Type (Polymer 1.1)

The following mixture is introduced into a reactor equipped with a magnetic stirrer and a reflux column, and comprising 160 g of acetone:
  16.64 g of methylisopropyl O-ethylxanthate (referred to hereinbelow as xanthate)
  63.36 g of acrylic acid,
  2 g of azobisisobutyronitrile.

The mixture is then stirred and maintained at reflux at 72° C. for 17 hours, and then cooled.

A transparent gel with a number-average molar mass of 1050 and a polydispersity index of 1.2 (measured by GPC in water using polyethylene glycol as standard) is obtained.

Example 1.2

Preparation of a Polyacrylic Acid/Polybutyl Acrylate Diblock Polymer Comprising a Reactive End of Xanthate Type (Polymer 1.2)

35 g of an aqueous solution comprising 20.16 g of the polymer obtained above are placed in a conical reactor equipped with a magnetic stirrer and a reflux column.

15.5 g of acetone and 10 g of water are then introduced via the condenser and the mixture is heated with stirring at 75° C.

10.5 g of butyl acrylate are then introduced over 6 hours, while keeping the temperature at 75° C.

The temperature is maintained for 12 hours after the end of the introduction.

The resulting product is soluble in water at pH 6 and room temperature.

10.5 g of butyl acrylate are then added according to the procedure indicated previously.

The final product has a number-average molar mass of about 2000, i.e. p(acrylic acid: Mn=1050)–p(butyl acrylate; Mn=1000).

The solids content of this polymer is 51%.

Example 1.3

Preparation of a Polyacrylamide Acid Diblock Polymer Comprising a Reactive End of Xanthate Type (Polymer 1.3)

The following are introduced into a reactor equipped with a magnetic stirrer and a reflux column:
  21 g of xanthate
  2.1 g of azobisisobutyronitrile
  100 g of solvent (90% ethanol/10% water)

The mixture is then stirred and heated to reflux at 75° C.

200 g of acrylamide and 200 g of solvent (40% ethanol/60% water) are then added over 5 hours.

The resulting mixture is then maintained at 75° C. with stirring for 1 hour, and is then cooled.

A transparent gel with a number-average molar mass of 1050 and a polydispersity index of 1 (measured by GPC in water using polyethylene glycol as standard) is obtained.

EXAMPLES 2

These examples illustrate the preparation of latices comprising the monoblock and diblock polymers according to the invention, and also the preparation of latices by carrying out standard techniques (comparative latices)

Procedure for Preparing the Latices 45 g of deionized water, 600 ppm of Abex® 2020 (mixture of ethoxylated fatty alcohol and of sulphated ethoxylated fatty alcohol, sold by Rhodia—amount based on the monomer) and 1.9 g of carboxylic monomer or polymer (their nature, which varies according to the examples, will be specified in the tables that follow) are placed in a reactor equipped with a magnetic stirrer and a reflux column.

The mixture is neutralized to a pH of between 6–7 with 20% sodium hydroxide solution The mixture is heated to 60° C. with stirring.

Separately, a monomer pre-emulsion is prepared in the following manner:

47.5 g of deionized water, 2.6 g of carboxylic monomer or polymer, 79.7 g of core monomers (the relative proportion of which, which varies according to the examples, will be given in the tables that follow) are mixed together.

The pre-emulsion is neutralized to a pH of between 6 and 7 with 20% sodium hydroxide solution.

20 g of the abovementioned pre-emulsion are rapidly added to the mixture at 60° C., followed by 0.17 g of sodium persulphate dissolved in 2 g of deionized water.

After addition of the pre-emulsion, the mixture is heated at 80–85° C. for 45 minutes. Once the temperature has stabilized, the remainder of the pre-emulsion is added over 3 hours. After one and a half hours, 50 g of water are added over one and a half hours.

The resulting latex is maintained at 85° C. for 30 minutes, followed by addition of 1000 ppm of tert-butyl peroxybenzoate and 1000 ppm of sodium metabisulphite.

The latex is then stripped.

The latex obtained has a solids content of 34.7%.

Example 2.1

Emulsion Polymerization of Styrene and of Butyl Acrylate in the Presence of Polymer 1.1 (Latex 2.1)

| Core monomers: | |
|---|---|
| Butyl acrylate: | 60.1% |
| Styrene: | 36.9% |
| Carboxylic polymer: | |
| Polymer 1.1: | 3% |

Example 2.2

Emulsion Polymerization of Styrene and of Butyl Acrylate in the Presence of Polymer 1.2 (Latex 2.2)

| Core monomers: | |
|---|---|
| Butyl acrylate: | 62.2% |
| Styrene: | 36.5% |
| Carboxylic polymer: | |
| Polymer 1.2: | 1.3% |

The mean diameter of the particles is 60 nm.

It should be noted that the latex flocculates at a pH of 3. This indicates that the latex bears polyacrylic acid-polybutyl acrylate grafts, concentrated at the surface of the particles.

Example 2.3

Emulsion Polymerization of Styrene and of Butyl Acrylate in the Presence of Polymer 1.3 (Latex 2.3)

| Core monomers: | |
|---|---|
| Butyl acrylate: | 61% |
| Styrene: | 36% |
| Carboxylic polymer: | |
| Polymer 1.3: | 3% |

Example 2.4

Emulsion Polymerization of Styrene and of Butyl Acrylate in the Presence of Polymer 1.1 (Latex 2.4)

| Core monomers: | |
|---|---|
| Butyl acrylate: | 60% |
| Styrene: | 36.5% |
| Carboxylic monomer and polymer: | |
| Itaconic acid: | 1% |
| Polymer 1.1: | 2.5% |

Example 2.5

Standard Free-Radical Emulsion Polymerization (Comparative Latex 2.1)

| Core monomers: | |
|---|---|
| Butyl acrylate: | 61% |
| Styrene: | 36% |
| Carboxylic monomer: | |
| Acrylic acid: | 3% |

Example 2.6

Standard Free-Radical Emulsion Polymerization
(Comparative Latex 2.3)

| Core monomers: | |
| --- | --- |
| Butyl acrylate: | 61% |
| Styrene: | 36% |
| Carboxylic monomer: | |
| Acrylamide: | 3% |

Example 2.7

Emulsion Polymerization of Styrene and of Butyl Acrylate in the Presence of Polymer 1.1
(Comparative Latex 2.4)

| Core monomers: | |
| --- | --- |
| Butyl acrylate: | 60% |
| Styrene: | 36.5% |
| Carboxylic monomers: | |
| Itaconic acid: | 1% |
| Acrylic acid: | 2.5% |

EXAMPLES 3

The aim of these examples is to show the properties of redispersion of a latex film deposited on glass.

Example 3.1

Use of Glutamic Acid Salt:

Latices Tested:
Latex 2.1
Comparative latex 2.1
Method:
Two batches are prepared for each of the two latices.

The first is dried without addition of a drying adjuvant and the second is dried in the presence of 5% by weight, relative to the latex polymer, of glutamic acid sodium salt.

A film 100 μm thick is deposited with each of these compositions and the whole is dried for 15 minutes at 120° C.

The results are collated in the table below

| Latex | Without | With |
| --- | --- | --- |
| 2.1 | 0 | 9 |
| 2.1 comparative | 0 | 0 |

The grades range from 0 (no redispersion) to 10 (total redispersion), according to a test which consists in placing a small amount of water at the surface of the film and in judging the quality of the dispersion after a few seconds.

The influence of the latices on the properties of redispersion of the dried film are seen without question. It may furthermore be noted that the contents of drying adjuvant are lower than those generally used in the prior art (about 15% in general, for latices of equivalent size, i.e. about 100 to 150 mm).

Example 3.2

Use of Tannin

Latices tested:
Latex 3.1
Comparative latex 3.1
Method:
The process is performed as for Example 3.1, except that the 5% of glutamic acid salt are replaced with 5% by weight, relative to the latex polymer, of Albatan GNL (tannin sold by Rhodia).

The results are collated in the table below

| Latex | Without | With |
| --- | --- | --- |
| 3.1 | 6 | 10 |
| 3.1 comparative | 0 | 10 |

The grades range from 0 (no redispersion) to 10 (total redispersion).

The advantage of using latices in accordance with the invention is once again evident, given the noteworthy changes in the redispersion properties.

EXAMPLE 4

The aim of this example is to show the wet abrasion resistance of a film of latex obtained according to the invention, and of a latex obtained by using a standard free-radical polymerization, these two films comprising calcium carbonate.

Latices tested:
Latex 2.1
Latex 2.2
Comparative latex 2.1
Preparation of the Compositions Tested:

The latices are mixed with Carbital 90 at a rate of 10 parts for the latex and 100 parts for the Carbital 90.

Carbital 90 is an aqueous suspension of calcium carbonate.

The solids content of the compositions is adjusted to 72.5% and the pH to 8.5.

The compositions are left to stand for 24 hours before being applied.

Wet Abrasion Test
(1) Manufacture of the Films

The mixtures are deposited on a support (known as "Lenetta") using a film drawer having a gap 275 μm thick.

The drying is carried out according to the following procedure (accelerated procedure):
24 hours in a conditioned room
24 hours at 55° C.
24 hours in a conditioned room
(2) Wet Abrasion Test The dried compositions are worn in the presence of a mixture of water and surfactant, using a brush which automatically carries out to-and-fro motions.

The number of cycles beyond which the paint, that has been worn away, allows the support to show through is recorded.

This test complies with standard MO 223VU013.

(3) Results

| Composition | Number of cycles |
|---|---|
| 2.1 | >5000 |
| 2.3 | 4300 |
| 2.1 comparative | 545 |

EXAMPLE 5

The aim of this example is to assess the stability on storage of compositions comprising a latex and calcium carbonate.

Latices Tested:

Latex 2.4

Comparative latex 2.4

Preparation of the Compositions Tested:

The latices are mixed with Carbital 90 at a rate of 10 parts for the latex and 100 parts for the Carbital 90.

Carbital 90 is an aqueous suspension of calcium carbonate.

The solids content of the compositions is adjusted to 72.5% and the pH to 8.5.

The compositions are left to stand for 24 hours before being applied.

Measurement of the Viscosity:

The viscosity values are measured (at 32 second$^{-1}$) before and after storage, for 3 days at 55° C. (Carri-Med CSL$^2$ 100 TA Instruments rheometer. These are flow viscosities under shear in cone/plate geometry).

The results are collated in the table below:

| | Viscosity (mPa · s) | |
|---|---|---|
| Composition | Before | After |
| 2.4 | 494 | 545 |
| 2.4 comparative | 290 | 2876 |

It is clearly seen that the composition comprising the latex according to the invention is more stable than that obtained using a standard free-radical polymerization.

The invention claimed is:

1. A latex having a modified surface chemistry, obtained by a process comprising the step of carrying out a free-radical emulsion polymerization in the presence of:
   at least one ethylenically unsaturated monomer or at least one polymer containing residual ethylenically unsaturated bonds,
   at least one free-radical polymerization initiator, and
   at least one water-soluble or water-dispersible monoblock, diblock or triblock polymer comprising at its end an active group capable of forming a radical, wherein the monoblock, diblock, or triblock polymer corresponds to the following formula:

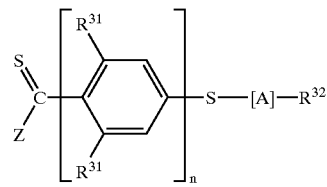

(III)

wherein:

$R^{32}$ represents:
   an optionally substituted alkyl, acyl, aryl, alkene or alkyne group (i),
   a saturated or unsaturated, optionally substituted or aromatic, carbon-based ring (ii), or
   a saturated or unsaturated, optionally substituted, heterocycle (iii),
   these groups, rings or heterocycles (i), (ii) and (iii) being optionally substituted with substituted phenyl groups, substituted aromatic groups or groups selected from the group consisting of:
      alkoxycarbonyl or aryloxycarbonyl (—COOR) groups,
      carboxyl (—COOH) groups,
      acyloxy (—O$_2$CR) groups,
      carbamoyl (—CONR$_2$) groups,
      cyano (—CN) groups,
      alkylcarbonyl groups, alkylarylcarbonyl groups, arylcarbonyl groups, arylalkylcarbonyl groups,
      phthalimido groups, maleimido groups, succinimido groups, amidino groups, guanidimo groups,
      hydroxyl (—OH) group,
      amino (—NR$_2$) group,
      halogen atoms,
      allyl groups,
      epoxy groups,
      alkoxy (—OR) groups,
      S-alkyl groups, S-aryl groups,
      organosilyl groups,
      alkali metal salts of carboxylic acids,
      alkali metal salts of sulphonic acid,
      polyalkylene oxide (PEO or PPO) chains and
      quaternary ammonium salts,
      wherein R represents an alkyl or aryl group, Z is selected from the group consisting of:
   hydrogen atom,
   optionally substituted alkyl, acyl, aryl, alkene or alkyne groups,
   saturated or unsaturated, optionally substituted, or aromatic, carbon-based rings,
   saturated or unsaturated, optionally substituted heterocycles,
   alkoxycarbonyl or aryloxycarbonyl (—COOR) groups,
   carboxyl (—COOH) groups,
   acyloxy (—O$_2$CR) groups,
   carbamoyl (—CONR$_2$) groups,
   cyano (—CN) groups,
   alkylcarbonyl groups, alkylarylcarbonyl groups, arylcarbonyl groups, arylalkylcarbonyl groups,
   phthalimido groups, maleimido groups, succinimido groups, amidino groups, guanidimo groups,
   hydroxyl (—OH) group,
   amino (—NR$_2$) group,
   halogen atoms, allyl groups,
epoxy groups,
alkoxy (—OR) groups,
S-alkyl groups, S-aryl groups,
organosilyl groups,
wherein R represents an alkyl or aryl group,
alkali metal salts of carboxylic acids,
alkali metal salts of sulphonic acid,
polyalkylene oxide (PEO or PPO) chains and
quaternary ammonium salts,
$R^{31}$ and $R^{33}$, which are identical or different, are selected from the group consisting of:
hydrogen atom,
optionally substituted alkyl, acyl, aryl, alkene or alkyne groups,
saturated or unsaturated, optionally substituted, or aromatic, carbon-based rings,
saturated or unsaturated, optionally substituted heterocycles,
alkoxycarbonyl or aryloxycarbonyl (—COOR) groups,
carboxyl (—COOH) groups,
acyloxy (—O$_2$CR) groups,
carbamoyl (—CONR$_2$) groups,
cyano (—CN) groups,
alkylcarbonyl groups, alkylarylcarbonyl groups, arylcarbonyl groups, arylalkylcarbonyl groups,
phthalimido groups, maleimido groups, succinimido groups, amidino groups, guanidimo groups,
hydroxyl (—OH) group,
amino (—NR$_2$) group,
halogen atoms,
allyl groups,
epoxy groups,
alkoxy (—OR) groups,
S-alkyl groups, S-aryl groups,
organosilyl groups,
wherein R represents an alkyl or aryl group,
alkali metal salts of carboxylic acids,
alkali metal salts of sulphonic acid,
polyalkylene oxide (PEO or PPO) chains,
quaternary ammonium salts, and
groups $SR^{32}$, wherein $R^{32}$ has the meaning given above,
n>0, and
A corresponds to at least one of the following formulae:

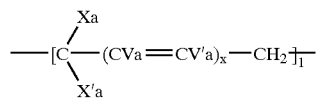

(AI)

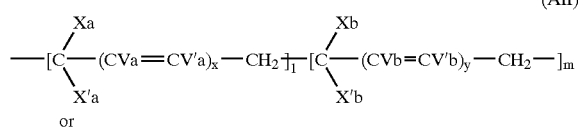

(AII)

or

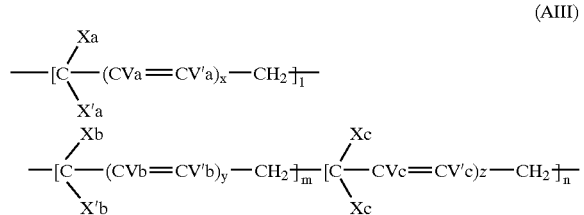

(AIII)

wherein:
Va, V'a, Vb, V'b, Vc and V'c, which are identical or different, represent H, an alkyl group or a halogen,
Xa, X'a, Xb, X'b, Xc and X'c, which are identical or different, represent H, a halogen or a group R, OR, OCOR, NHCOH, OH, NH$_2$, NHR, N(R)$_2$, (R)$_2$N$^+$O$^-$, NHCOR, CO$_2$H, CO$_2$R, CN, CONH$_2$, CONHR or CONR$_2$, wherein R, which is identical or different, is selected from the group consisting of alkyl, aryl, aralkyl, alkaryl, alkene and organosilyl groups, optionally perfluorinated and optionally substituted with one or more carboxyl, epoxy, hydroxyl, alkoxy, amino, halogen or sulphonic groups,
l, m and n, which are identical or different, are greater than or equal to 1,
x, y and z, which are identical or different, are equal to 0 or 1.

2. The latex according to claim 1, wherein the monoblock, diblock or triblock polymer has a number-average molar mass of less than 20 000.

3. The latex according to claim 2, wherein the number-average molar mass is less than 10 000.

4. The latex according to claim 1, wherein the at least one ethylenically unsaturated monomer is a monomer of the following formula:

CX$d$X'$d$(=CV$d$-CV'$d$)$_t$=CH$_2$ wherein:
Xd and X'd, which are identical or different, represent: H, an alkyl group or a halogen,
Vd and V'd, which are identical or different, represent H, a halogen or a group R, OR, OCOR, NHCOH, OH, NH$_2$, NHR, N(R)$_2$, (R)$_2$N$^+$O$^-$, NHCOR, CO$_2$H, CO$_2$R, CN, CONH$_2$, CONHR or CONR$_2$, wherein R, which is identical or different, is selected from the group consisting of alkyl, aryl, aralkyl, alkaryl, alkene and organosilyl groups, optionally perfluorinated and optionally substituted with one or more carboxyl, epoxy, hydroxyl, alkoxy, amino, halogen or sulphonic groups, and
t is 0 or 1.

5. The latex according to claim 4, wherein the at least one ethylenically unsaturated monomer is selected from the group consisting of: styrene, derivatives thereof, butadiene, chloroprene, (meth)acrylic esters and vinyl nitriles.

6. The latex according to claim 1, wherein the at least one polymer containing residual ethylenically unsaturated bonds is obtained by free-radical polymerization of at least one ethylenically unsaturated monomer having the following formula:

CX$d$X'$d$ (=CV$d$-CV'$d$)$_t$=CH$_2$ wherein:
Xd and X'd, which are identical or different, represent: H, an alkyl group or a halogen,
Vd and V'd, which are identical or different, represent H, a halogen or a group R, OR, OCOR, NHCOH, OH, NH$_2$, NHR, N(R)$_2$, (R)$_2$N$^+$O$^-$, NHCOR, CO$_2$H, CO$_2$R, CN, CONH$_2$, CONHR or CONR$_2$, wherein R, which is identical or different, is selected from the group consisting of alkyl, aryl, aralkyl, alkaryl, alkene and organosilyl groups, optionally perfluorinated and optionally substituted with one or more carboxyl, epoxy, hydroxyl, alkoxy, amino, halogen or sulphonic groups, and
t is 0 or 1.

7. The latex according to claim 1, wherein the polymerization is carried out by introducing the at least one ethylenically unsaturated monomer and the initiator into a solution of the monoblock, diblock or triblock polymer.

8. The latex according to claim 1, wherein the polymerization is carried out by introducing in parallel the at least one ethylenically unsaturated monomer, the initiator and a solution of the monoblock, diblock or triblock polymer.

9. The latex according to claim 1, wherein the polymerization is carried out by introducing the monoblock, diblock or triblock polymer and the initiator into a suspension comprising the at least one polymer containing residual ethylenically unsaturated bonds.

10. A redispersible powder obtained by drying a latex having a modified surface chemistry according to claim 1.

11. The redispersible powder according to claim 10, wherein drying is performed in the presence of a drying adjuvant.

12. A formulation comprising the latex having modified surface chemistry according to claim 1.

13. The formulation according to claim 12, wherein the formulation is a building material formulation, a paint formulation, an adhesive formulation, optionally a pressure sensitive adhesive formulation, or a paper formulation.

14. A process for making a formulation comprising the step of using the latex having modified surface chemistry according to claim 1.

15. The process for making a formulation according to claim 14, wherein the formulation is a building material formulation, a paint formulation, an adhesive formulation, optionally a pressure sensitive adhesive formulation, or a paper formulation.

16. A latex having a modified surface chemistry, obtained by a process comprising the step of carrying out a free-radical emulsion polymerization in the presence of:
   at least one ethylenically unsaturated monomer or at least one polymer containing residual ethylenically unsaturated bonds,
   at least one free-radical polymerization initiator, and
   at least one water-soluble or water-dispersible monoblock, diblock or triblock polymer comprising at its end an active group capable of forming a radical, wherein the monoblock, diblock, or triblock polymer corresponds to the following formula:

$$S=C(Z)\text{-}[C\equiv C]_n\text{—}S\text{-}[A]\text{-}R^{41} \qquad (IV)$$

wherein:
   $R^4$ represents:
      an optionally substituted alkyl, acyl, aryl, alkene or alkyne group (i),
      a saturated or unsaturated, optionally substituted or aromatic, carbon-based ring (ii), or
      a saturated or unsaturated, optionally substituted, heterocycle (iii),
         these groups, rings or heterocycles (i), (ii) and (iii) being optionally substituted with substituted phenyl groups, substituted aromatic groups or groups selected from the group consisting of:
            alkoxycarbonyl or aryloxycarbonyl (—COOR) groups,
            carboxyl (—COOH) groups,
            acyloxy (—O$_2$CR) groups,
            carbamoyl (—CONR$_2$) groups,
            cyano (—CN) groups,
            alkylcarbonyl groups, alkylarylcarbonyl groups, arylcarbonyl groups, arylalkylcarbonyl groups,
            phthalimido groups, maleimido groups, succinimido groups, amidino groups, guanidimo groups,
            hydroxyl (—OH) group,
            amino (—NR$_2$) group,
            halogen atoms,
            allyl groups,
            epoxy groups,
            alkoxy (—OR) groups,
            S-alkyl groups, S-aryl groups,
            organosilyl groups,
            alkali metal salts of carboxylic acids,
            alkali metal salts of sulphonic acid,
            polyalkylene oxide (PEO or PPO) chains and
            quaternary ammonium salts,
            wherein R represents an alkyl or aryl group,
      Z is selected from the group consisting of:
         hydrogen atom,
         optionally substituted alkyl, acyl, aryl, alkene or alkyne groups,
         saturated or unsaturated, optionally substituted, or aromatic, carbon-based rings,
         saturated or unsaturated, optionally substituted heterocycles,
         alkoxycarbonyl or aryloxycarbonyl (—COOR) groups,
         carboxyl (—COOH) groups,
         acyloxy (—O$_2$CR) groups,
         carbamoyl (—CONR$_2$) groups,
         cyano (—CN) groups,
         alkylcarbonyl groups, alkylarylcarbonyl groups, arylcarbonyl groups, arylalkylcarbonyl groups,
         phthalimido groups, maleimido groups, succinimido groups, amidino groups, guanidimo groups,
         hydroxyl (—OH) group,
         amino (—NR$_2$) group,
         halogen atoms,
         allyl groups,
         epoxy groups,
         alkoxy (—OR) groups,
         S-alkyl groups, S-aryl groups,
         organosilyl groups,
         wherein R represents an alkyl or aryl group,
         alkali metal salts of carboxylic acids,
         alkali metal salts of sulphonic acid,
         polyalkylene oxide (PEO or PPO) chains and
         quaternary ammonium salts,
      n>0, and
      A corresponds to at least one of the following formulae:

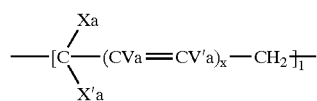

(AI)

-continued

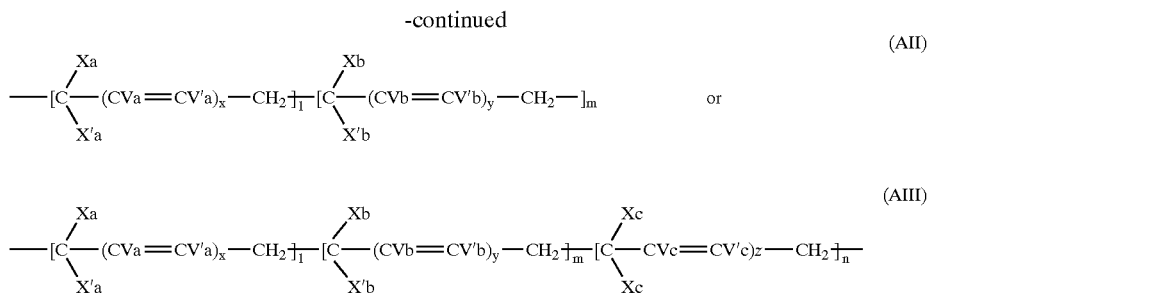

wherein:

Va, V'a, Vb, V'b, Vc and V'c, which are identical or different, represent H, an alkyl group or a halogen, Xa, X'a, Xb, X'b, Xc and X'c, which are identical or different, represent H, a halogen or a group R, OR, OCOR, NHCOH, OH, $NH_2$, NHR, $N(R)_2$, $(R)_2N^+O^-$, NHCOR, $CO_2H$, $CO_2R$, CN, $CONH_2$, CONHR or $CONR_2$, wherein R, which is identical or different, is selected from the group consisting of alkyl, aryl, aralkyl, alkaryl, alkene and organosilyl groups, optionally perfluorinated and optionally substituted with one or more carboxyl, epoxy, hydroxyl, alkoxy, amino, halogen or sulphonic groups, l, m and n, which are identical or different, are greater than or equal to 1, x, y and z, which are identical or different, are equal to 0 or 1.

17. The latex according to claim 16, wherein the monoblock, diblock or triblock polymer has a number-average molar mass of less than 20 000.

18. The latex according to claim 17, wherein the number-average molar mass is less than 10 000.

19. The latex according to claim 16, wherein the at least one ethylenically unsaturated monomer is a monomer of the following formula:

wherein:

Xd and X'd, which are identical or different, represent: H, an alkyl group or a halogen, Vd and V'd, which are identical or different, represent H, a halogen or a group R, OR, OCOR, NHCOH, OH, $NH_2$, NHR, $N(R)_2$, $(R)_2N^+O^-$, NHCOR, $CO_2H$, $CO_2R$, CN, $CONH_2$, CONHR or $CONR_2$, wherein R, which is identical or different, is selected from the group consisting of alkyl, aryl, aralkyl, alkaryl, alkene and organosilyl groups, optionally perfluorinated and optionally substituted with one or more carboxyl, epoxy, hydroxyl, alkoxy, amino, halogen or sulphonic groups, and t is 0 or 1.

20. The latex according to claim 19, wherein the at least one ethylenically unsaturated monomer is selected from the group consisting of: styrene, derivatives thereof, butadiene, chloroprene, (meth)acrylic esters and vinyl nitriles.

21. The latex according to claim 16, wherein the polymer containing residual ethylenically unsaturated bonds is obtained by free-radical polymerization of at least one ethylenically unsaturated monomer having the following formula:

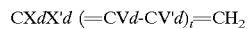

wherein:

Xd and X'd, which are identical or different, represent: H, an alkyl group or a halogen, Vd and V'd, which are identical or different, represent H, a halogen or a group R, OR, OCOR, NHCOH, OH, $NH_2$, NHR, $N(R)_2$, $(R)_2N^+O^-$, NHCOR, $CO_2H$, $CO_2R$, CN, $CONH_2$, CONHR or $CONR_2$, wherein R, which are identical or different, are selected from the group consisting of alkyl, aryl, aralkyl, alkaryl, alkene and organosilyl groups, optionally perfluorinated and optionally substituted with one or more carboxyl, epoxy, hydroxyl, alkoxy, amino, halogen or sulphonic groups, and t is 0 or 1.

22. The latex according to claim 16, wherein the polymerization is carried out by introducing the at least one ethylenically unsaturated monomer and the initiator into a solution of monoblock, diblock or triblock polymer.

23. The latex according to claim 16, wherein the polymerization is carried out by introducing in parallel the at least one ethylenically unsaturated monomer, the initiator and a solution of the monoblock, diblock or triblock polymer.

24. The latex according to claim 16, wherein the polymerization is carried out by introducing the monoblock, diblock or triblock polymer and the initiator into a suspension comprising the at least one polymer containing residual ethylenically unsaturated bonds.

25. A redispersible powder obtained by drying a latex having a modified surface chemistry according to claim 16.

26. The redispersible powder according to claim 25, wherein drying is performed in the presence of a drying adjuvant.

27. A formulation comprising the latex having modified surface chemistry according to claim 16.

28. The formulation according to claim 27, wherein the formulation is a building material formulation, a paint formulation, an adhesive formulation, optionally a pressure sensitive adhesive formulation, or a paper formulation.

29. A process for making a formulation comprising the step of using the latex having modified surface chemistry according to claim 16.

30. The process for making a formulation according to claim 29, wherein the formulation is a building material formulation, a paint formulation, an adhesive formulation, optionally a pressure sensitive adhesive formulation, or a paper formulation.

* * * * *